Oct. 22, 1929.  E. E. KLEINSCHMIDT  1,732,367
MOTOR CONSTRUCTION AND REGULATING MEANS THEREFOR
Original Filed March 31, 1923
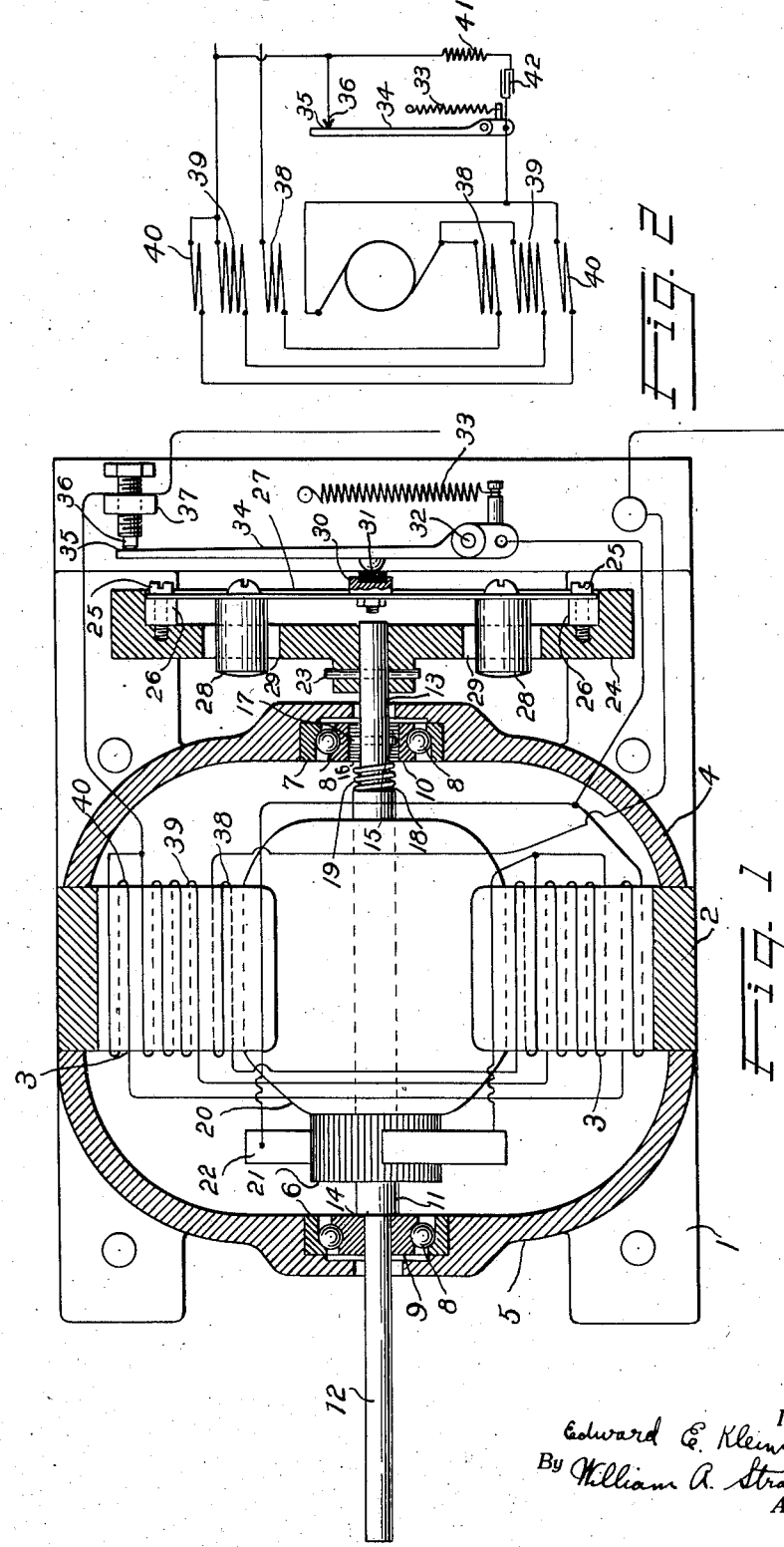
Inventor
Edward E. Kleinschmidt
By William A. Strauch
Attorney Patented Oct. 22, 1929

1,732,367

UNITED STATES PATENT OFFICE

EDWARD E. KLEINSCHMIDT, OF CHICAGO, ILLINOIS, ASSIGNOR, BY MESNE ASSIGNMENTS, TO TELETYPE CORPORATION, OF CHICAGO, ILLINOIS, A CORPORATION OF DELAWARE

MOTOR CONSTRUCTION AND REGULATING MEANS THEREFOR

Application filed March 31, 1923, Serial No. 629,169. Renewed February 27, 1929.

This invention relates to improvements in motor construction, and regulating means therefor.

More particularly, it relates to an improved form of motor adapted for use under varying conditions, and regulating means for maintaining a substantially constant speed of operation under sudden changes of load.

In the driving of mechanisms, where a uniform speed is essential and the load varies suddenly during the performance of successive cycles of operations, for example, printing telegraph machines, the usual forms of driving motors are unsatisfactory. The sudden changes in load cause speed variations, arcing, and blackening of the commutator, when motors of ordinary construction are used. These motors are installed where there usually is no attendant to give them constant care, and where they must give continuous high speed service. For this reason it is essential that they be of simple, rugged construction, and closely automatically regulated.

An object of the present invention is to provide a simplified motor construction, in which a constant speed is maintained under widely varying load conditions suitable for the above mentioned class of service. A further object is the provision of a motor in which all the windings and the regulating resistances are wholly enclosed. Other objects of the invention are to provide an improved form of extremely sensitive and frictionless centrifugal governor to control the operation of the motor; to provide an arrangement for regulating motors in which surging as the motor starts and as the governor operates is prevented; arcing at the governor contacts and blackening of commutator is prevented, and in which such other objects as appear in the following description and claims are attained.

It will of course be understood that the invention is not limited in use to driving printing telegraph machines, but is useful in any relation where a constant speed motor under varying loads is desired.

Referring to the accompanying drawings and the following description for a full disclosure of the invention:

Figure 1 is a sectional plan view showing the motor and governor construction.

Figure 2 is a wiring diagram showing the field connections and governor control circuits.

Secured to base plate 1 in any convenient manner, is a circular yoke 2 which may be of soft cast or forged iron, or may be built up of the usual soft iron laminations. Yoke 2 may be cast integral with base plate 1 or may be secured thereto by bolts or studs (not shown) in well known manner. Pole pieces 3, made up preferably of soft iron laminations, are secured to yoke 2, in convenient manner, as by casting or keying in when the yoke is solid, or being made integral with the yoke stampings when the yoke is made up of laminations. The number of pole pieces 3 will of course vary with the size and the design of the motor. Cast end cover plates 4 and 5 are supported from base 1 and secured to yoke 2 in a manner to form dirt tight joints. The specific manner of securing parts 1 to 5 together is a matter well within the skill of a designer or engineer, and the showing has therefore been omitted to more clearly set forth the essential elements of the invention.

Set into cover plates 4 and 5 are hardened steel ball race thrust rings 6 and 7. Supported and rotatably mounted on balls 8, are hardened thrust members 9 and 10. Shoulders are formed in rings 6 and 7 and in thrust rings 9 and 10 as shown in Figure 1 so that end thrust ball bearings are formed. Motor shaft 11 is formed at one end with a reduced extension 12 and at the other end with a reduced extension 13. Member 9 is forced on the motor shaft over 12 until it abuts against the shoulder 14. Member 10 is reamed to a sliding fit on extension 13, and has keyways 15 and 16 cut therein. Driven through extension 13 is a key 17, fitted to slide in keyways 15 and 16. Interposed between the shoulder 18 on shaft 11 and member 10 is a compression spring 19. Carried upon shaft 11 is an armature 20 with the usual commutator 21 and brushes 22. The details of the commutator, brushes and armature are no part of the present invention. It will, however, be apparent that novel end thrust ball bearings together with means for preventing end play of the motor shaft in operation, are provided.

Secured to extension 13 by a driven key 23 is a circular shaped governor member 24. Fastened to member 24, by screws 25, but spaced therefrom by members 26 is a flat strip spring 27. Rigidly secured to spring 27 are weights 28 which extend through openings 29 in member 24. The holes in spring 27 through which the screws 25 pass are elongated sufficiently to permit spring 27 to flex slightly due to the centrifugal force of weights 28. Fastened to the center of spring 27 is a contact operating member 30 with a piece of insulation 31 set therein. Pivotally mounted at 32 and normally held against 31 by spring 33 is a contact member 34. Spring 33 tends to separate contacts 35 and 36. Contact 36 is adjustably mounted on a support 37 secured to base 1, but is insulated therefrom.

The entire windings and regulating resistances for the motor are inclosed within the cover plates 4 and 5 as diagrammatically indicated in Figure 1. The necessary wiring leads in cover plate 4 and the usual binding posts are of course provided in any well known manner.

The method of applying the field windings and the regulating resistances is an essential part of this invention. Referring to Figure 2, 38 represents a low resistance series field windings, 39 represents shunt field windings; and 40 represents high resistance series windings. It will of course be understood that one each of the windings 38, 39 and 40 are placed on each pole piece 3. When contacts 35 and 36 are closed by the governor action, high resistance windings 40 will be short circuited; and when these contacts are open, windings 40 will be effective as series windings and also will act as a high resistance in series with the armature functioning in well known manner to reduce the speed.

As will be well understood by those skilled in the art the dying away of the field strength due to the decrease of series field current through windings 38 when contacts 35 and 36 are opened, creates momentary potentials tending to cause arcing at the contacts 35 and 36 and at the commutator and brushes. Even in a regulator of the present type in which the field is never opened, this arcing is highly undesirable. Resistances 40 are therefore wound in such a manner that the dying away of the field strength is opposed thereby when they are cut into the circuit by the opening of contacts 35 and 36. Windings 40 are so proportioned that substantially no tendency to arc exists when the governor contacts are opened. The ideal condition exists when no change in field strength occurs as the governor contacts operate and in constructing the motors an effort is made to realize this ideal condition. By this arrangement arcing is minimized, and any slight tendency to arc due to a failure or inability to attain the ideal condition is obviated by the use of a shunt around the contacts 35 and 36 comprising a high resistance 41 and condenser 42. When contacts 35 and 36 are closed windings 40 form short circuited field windings which render the field sluggish and oppose change therein. The short circuited windings therefore tend to prevent surging and sudden speed changes of the motor. If desired, windings 40 may be proportioned to actually increase the field strength instead of maintaining it unchanged when they are cut into the circuit. In this manner they will also serve to assist in decreasing the motor speed as well as minimizing the arcing, in addition to their function as armature resistances.

*Operation*

When the motor is at rest, contacts 35 and 36 are closed and windings 40 are short circuited. When power is switched on, the motor operates as a compound motor, the characteristics of which are well known, viz: a high starting torque and rapid attainment of full speed. Contacts 35 and 36 and the governor, are adjusted so that when the motor is up to speed under normal load, contacts 35 and 36 are opened due to the flexing of spring 27 under the centrifugal force exerted thereon by weights 28. All end play is prevented due to the thrust of spring 19 on the motor shaft, and the operation of contacts 36 and 37 can therefore be closely regulated. The importance of this arrangement to prevent end play will be apparent in view of necessarily close adjustment of the governor and the contacts controlled thereby. Slight end movement of the shaft, if permitted, would destroy the regulation.

When the motor is up to speed and is driving its full load, as hereinbefore explained, contacts 36 and 37 are closed, and windings 40 are short circuited and not effective. As the load is decreased, the speed of the motor will increase slightly, spring 27 will flex a greater amount and contacts 35 and 36 will be opened by spring 33. This will place high-resistance field windings 40 in series with the windings of armature 20. The added resistance will decrease the current flowing through the armature and the speed of the motor will be reduced. This will close contacts 35 and 36 as hereinbefore described, and windings 40 will again be short-circuited. This cycle of operation will be repeated at short intervals and will keep the speed of the motor at a constant average value.

Having described a preferred embodiment of the invention, what is desired to be secured by Letters Patent and claimed as new is:

1. A motor comprising a main field winding; an auxiliary high resistance field winding opposed to said main field winding; a rotary armature; a single pair of short-circuiting contacts for said auxiliary winding; and means controlled by the speed of rotation of said armature independently of the relative angular position of said armature with respect to said contacts for actuating said short circuiting contacts.

2. A motor comprising a main series field winding; a shunt field winding permanently opposed to said series field winding; an auxiliary high resistance field winding opposed to said main series field winding; a rotary armature; contacts, means controlled by the speed of rotation of said armature for controlling the contacts, said contacts short circuiting said auxiliary winding; said main, shunt, and auxiliary windings being so proportioned and arranged that substantially no flux change occurs as said contacts operate whereby arcing is avoiding.

3. A motor comprising a set of main field windings; an armature circuit; a regulating resistance; a set of contacts, means controlled by the speed of rotation of said armature operating said contacts, said contacts inserting said resistance in, and removing the same from said armature circuit; said high resistance being applied as a field winding and so proportioned with relation to said main field windings that substantially no flux change occurs during the operation of said contacts.

4. A motor comprising a rotary armature shaft; an armature mounted on said shaft; a thrust bearing member in which said shaft is mounted on one side of said armature; an axially movable thrust bearing member in which said shaft is mounted on the other side of said armature; and a spring interposed between said last mentioned thrust bearing member and said armature.

Signed at Long Island City, New York, this 30th day of March, 1923.

EDWARD E. KLEINSCHMIDT.